United States Patent [19]
Goodson

[11] 3,715,467
[45] Feb. 6, 1973

[54] TINT CONTROL FOR COLOR TELEVISION RECEIVER

[75] Inventor: Larry Eugene Goodson, Portsmouth, Va.

[73] Assignee: General Electric Company

[22] Filed: Nov. 13, 1970

[21] Appl. No.: 89,413

[52] U.S. Cl. ....................178/5.4 HE
[51] Int. Cl. ....................H04n 9/12
[58] Field of Search ..........178/5.4, 5.4 HE, 5.4 MC; 331/74

[56] References Cited

UNITED STATES PATENTS 3,436,470 4/1969 Konkel et al. ....................178/5.4 HE
3,518,363 6/1970 Funston et al. ....................178/5.4 HE

*Primary Examiner*—Richard Murray
*Attorney*—Frank L. Neuhauser, Oscar B. Waddell, Joseph B. Forman, W. J. Shanley, Stanley C. Corwin and F. W. Powers

[57] ABSTRACT

A phase shifting device used in conjunction with a reference oscillator providing a reference signal for demodulating chroma signals in a color television receiver. A first inductor is connected in series between a reference oscillator and an amplifier stage, and a capacitor and the series combination of a variable resistance and an inductor is connected between a point of reference potential and the intersection of the first series inductor and the amplifier means. Changes in the value of the variable resistance cause the phase of signals transmitted to the amplifier means to vary.

5 Claims, 3 Drawing Figures

INVENTOR.
LARRY E. GOODSON
BY James E. Espe
HIS ATTORNEY

INVENTOR
LARRY E. GOODSON
BY James E. Espe
HIS ATTORNEY

TINT CONTROL FOR COLOR TELEVISION RECEIVER

BACKGROUND OF THE INVENTION

The present invention relates to tint control means for color television receivers, and, more particularly, to a phase shifting network for changing the relative phase of a 3.58 MHz reference signal derived from the burst signal.

The signal bearing color information in a color television receiver is ordinarily derived from a pair of amplitude-modulated R–Y and B–Y sinusoidal signals displaced in phase by 90° and combined to form a single signal. This signal, known as the chroma signal, is applied to a pair of demodulators, one demodulator for recovering each of the combined signals. Within each demodulator, the common chroma signal is combined with a 3.58 MHz sinusoidal signal, the phase relationship between the reference signal and the chroma signal determining the hue to be derived from the chroma signal. The reference signal obtained from an oscillator which is kept in synchronism with the received signals by means of a periodically-transmitted 3.58 MHz signal, known as a burst signal. The burst signal is abstracted from the received video signal by means of a burst gate and applied to the reference oscillator for obtaining a reference signal which has a predetermined phase relationship with the received chroma signal. Normally, the burst signal is 180° out of phase with one of the two components of the chroma signal, this component being the B–Y signal. Thus, for obtaining the B–Y signal from a demodulator, it is necessary to apply the chroma signal to the demodulator in combination with a reference signal which is 180° out of phase with the burst signal.

In order to derive that portion of the chroma signal transmitted in quadrature with the B–Y signal, known as the R–Y signal, the reference signal must be phase shifted by 90° and applied to the second demodulator in combination with the chroma signal. It is thus manifest that the phase relationship between the reference signal and the chroma signal is of crucial importance in deriving color signals representing predetermined hues from the chroma signal. Slight changes in the relative phase between the chroma and reference signals cause phasors representing the relative angles of demodulation to rotate from their original orientations, resulting in the production of color signals representing hues different from those desired.

In the operation of a typical color television receiver, aberrations in received chroma signals, or variances from one chroma signal to the next are often encountered due to variations in the characteristics of signal transmitting equipment or in the characteristics of various color television cameras. Further, slight changes in characteristics of receiver components occasionally occur so as to modify the phase relationship between the reference subcarrier and the chroma signals. For this reason, adjustable means are often provided for modifying the phase angle of the reference subcarrier. Such devices may be placed at any advantageous position in the subcarrier path, for instance between the reference signal generator and stage which amplifies the subcarrier and applies it to subsequent demodulating stages.

While various phase shifting circuits, hereinafter referred to as tint control circuits, have been devised prior art tint controls exhibit several disadvantages. Tint control means which are inserted in series with the subcarrier conductor necessitate bringing the subcarrier conductor to an accessible portion of the receiver, usually physically remote from the subcarrier oscillator and amplifier circuitry, and then returning the conductor to the subcarrier amplifier or the demodulators. Extending the length of the subcarrier path in this manner is undesirable, for it exposes the subcarrier conductor to the electromagnetic influence of other receiver components; moreover, it is deemed undesirable to bring such a high-frequency signal of relatively high amplitude into close proximity to the control area of the receiver. In addition, prior art approaches have often been accompanied by an undesirable degree of attenuation of the reference signal, loading the circuit and requiring extra power from the reference oscillator. Further, previously known approaches which were satisfactory in other respects often required a plurality of costly components such as varactor diodes, voltage divider and extra power supplies, adding to the cost of the receiver.

SUMMARY OF THE INVENTION

It is therefore an object of the present invention to provide an improved tint control circuit for a color television receiver which does not require transmission of the subcarrier reference signal to a control area of the receiver, and back to a point of utilization.

It is another object of the present invention to provide a tint control means for a color television receiver which does not attenuate the reference signal.

It is a further object of the present invention to provide a tint control for a color television receiver which is more economical to construct than those previously known.

Briefly stated, in accordance with one aspect of the present invention, the foregoing objects are achieved by providing a first inductor in series with a conductor which transmits the reference subcarrier and is advantageously located between a subcarrier generator or oscillator and the input terminal of the subcarrier amplifier. The amplifier input is then connected to the parallel combination of a capacitor and a series circuit including a variable resistance and a second inductor. The system is tuned such that a point of resonance, or slightly below resonance, is reached at the frequency of the reference subcarrier so that a voltage step-up will be experienced by the subcarrier due to the resonant characteristic of the network. The angle of phase shift obtained from the system is modified by changing the value of the variable resistance such that the contribution of the second inductor is varied.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF THE PREFERRED EMBODIMENT

Figure 1:
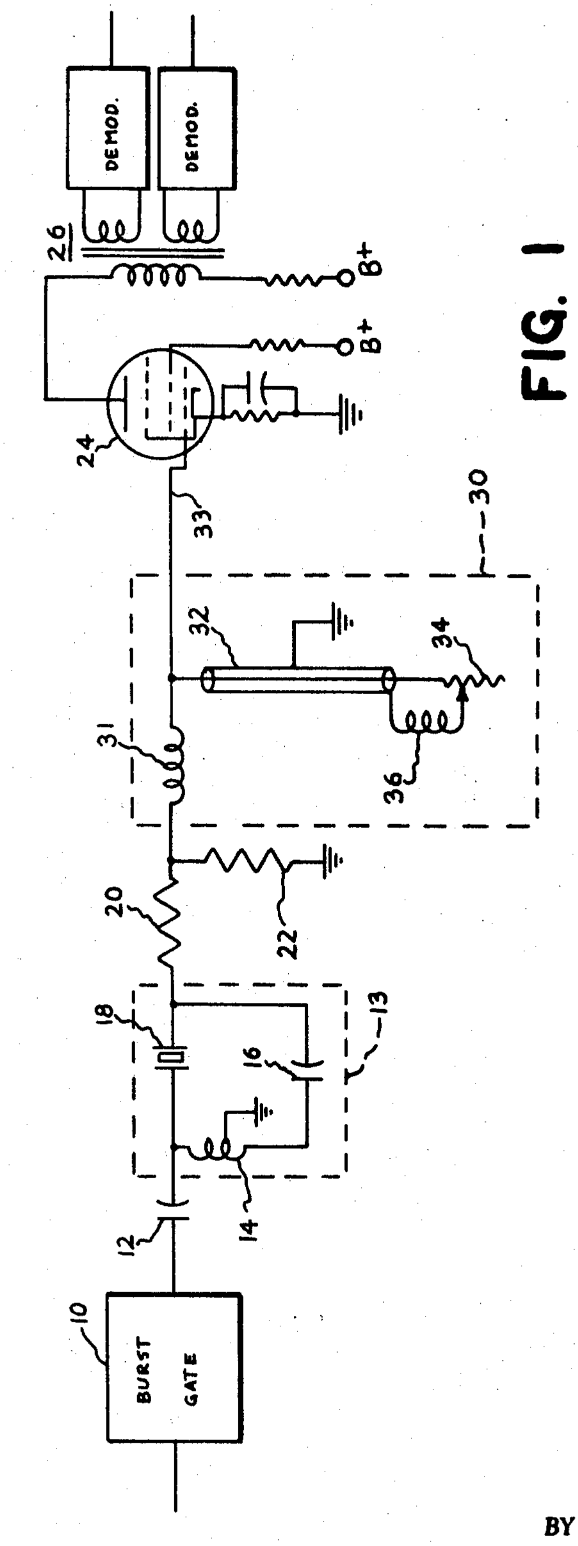
FIG. 1 is a schematic diagram of selected portions of a color television receiver, showing the inventive tint control means.

Referring now to FIG. 1, a schematic diagram is shown of the reference subcarrier path within a typical color television receiver. A burst gate 10 is keyed by pulses derived from a suitable source, such as a pulse transformer (not shown). The gate is thus caused to become operative at the proper time to allow the 3.58 MHz burst signal transmitted at the "back porch" of the horizontal synchronizing pulse to be transmitted to the reference signal circuitry by means of coupling capacitor 12. An oscillator 13 comprising a resonant circuit including center-tapped inductance 14, capacitance 16, and crystal oscillator 18 is tuned to oscillate at the reference signal frequency and is kept in step with other video signals by the periodic application of the burst signal. The reference signal thus derived is applied through a resistor 20 to utilization means, such as a subcarrier amplifier, herein depicted as pentode 24. A grid return resistor 22 is connected between the signal path and ground. The subcarrier amplifier advantageously transmits the amplified waveform, still at the reference frequency, to a pair of demodulators by means of a transformer 26 having a separate secondary winding for each demodulator.

Transformer 26 may advantageously be provided with moveable core members (not shown) which allow the phase of the signals outputted by the transformer secondary windings to be adjusted for providing subcarriers having the desired phase relationship to the demodulation stages. A tint control network 30 comprising first inductor 31, shielded cable 32, a potentiometer 34 and a second inductor 36 is connected to a conductor 33 extending from the control grid of amplifier 24 for modifying the phase of the reference signals transmitted to the subcarrier amplifier. It will be seen that while first inductor 31 remains in series with the conductor carrying the reference signal to the subcarrier amplifier, the adjustable portion of the tint control circuit may be positioned at a convenient point remote from the subcarrier conductor.

The conductor connecting the adjustable elements of the phase shift device to the signal path advantageously comprises a shielded cable 32 for preventing the subcarrier signal from interfering with other signals within the receiver. Since the site of the adjustable tint control is dictated by viewer accessibility while that of the subcarrier circuit is dictated by other, often conflicting considerations a relatively long conductor must be provided for coupling the adjustable portion to the subcarrier signal path. As will now be explained, the added length of shielded conductor is turned to advantage by the present tint control network.

An inherent capacitance exists between the shielding element of a shielded cable and the conductor therein. The shield may be thought of as one plate of a capacitor, the conductor forming the other plate such that as the length of shielded cable is increased, the capacitance afforded also increases. Thus, by grounding the cable shield a capacitance is introduced into the circuit which is essentially in shunt between the conductor and the ground plane. This capacitance may be provided by means of a discrete capacitor, although in the embodiment illustrated in FIG. 1 a shielded cable is utilized.

One end of the second inductor 36 is attached directly to the cable shield, the shield forming a convenient ground connection. The other end of inductor 36 is attached to the adjustable element or slider of potentiometer 34, one end of the resistive element of the potentiometer being connected through the shielded cable conductor to the subcarrier conductor, the other end being left unconnected. A pair of reactive circuits are now constituted between the subcarrier conductor and ground; the first comprising the capacitance constituted by shielded cable 32, the other comprising the series combination of inductor 36 and a selected portion of the resistive element of potentiometer 34. These two electrically parallel reactive legs, in combination with first inductor 30 lying in series with the subcarrier path, form a tuned circuit which resonates at a frequency determined by the values of the various elements. At frequencies about its resonance point, the circuit steps up the amplitude of the signal transmitted thereby despite variations in the resistive value of the potentiometer 34.

While it will be recognized that optimum circuit parameters are determined by various factors, including signal strength, the output impedance of the reference signal generating means, the input impedance of the subcarrier amplifier, and various stray capacitances encountered by the circuitry which result from the interaction of the circuitry with surrounding elements, the following values have been found to provide the desired characteristics;

| | |
|---|---|
| Inductor **31** | 56 microhenrys |
| Inductor **36** | 56 microhenrys |
| Potentiometer **34** | 25 K ohms |
| Shielded cable **32** | 34 picofarads |

Figure 2:
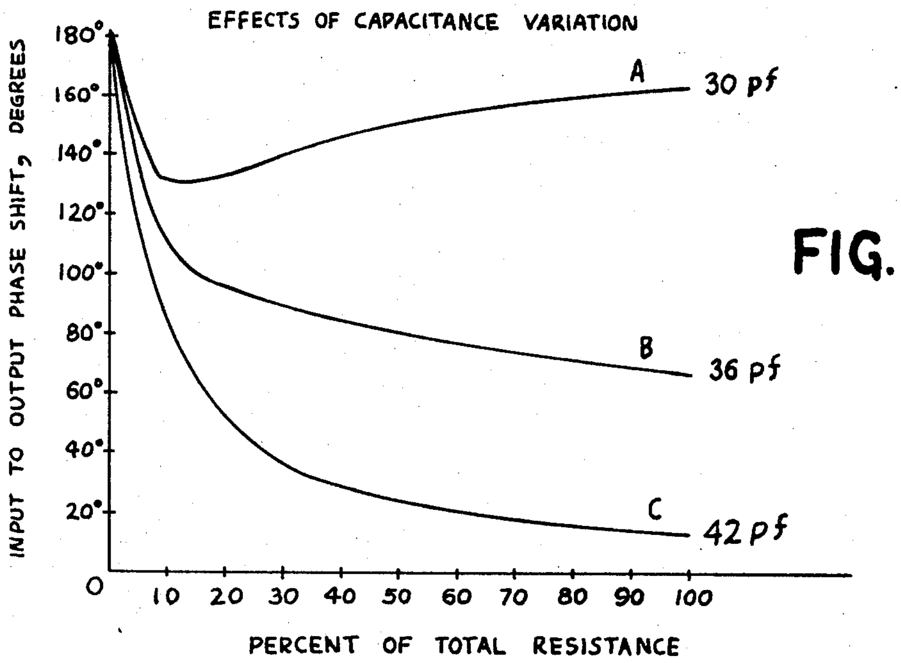
FIG. 2 is a graph showing phase shift as a function of circuit adjustment, for various capacitance values.

The effect of variations in the amount of capacitance provided by the shielded cable 32, and of the resistance provided by potentiometer 34 are shown in FIG. 2. Input-to-output phase shift afforded by the tint control network is represented upon the vertical axis, while the percent of total resistance available from the 25 K ohm potentiometer is represented along the horizontal axis. Curve A represents the phase shift effected by the system when the capacitance of the shielded cable 36 is 30 pf. At this value, the capacitance causes a condition of above resonance, and phase shift in a first direction is obtained as resistance decreases, approximately 35° being obtained in this manner. As resistance declines to approximately 10 percent of the total available, the phase shift reverses, recedes to its original value, and increases approximately 15° in the opposite direction as the resistive value of the potentiometer goes to zero. When the network is provided with a shielded cable having a capacitance of 36 picofarads the phase shift, indicated by curve B advances approximately 30° in a substantially linear fashion as the resistance of potentiometer 34 is decreased until all but about 15 percent of the total resistance of the potentiometer is eliminated. The phase shift then advances very rapidly for the next 80°, as the remaining 15 percent of the resistance is removed. When capacitance is raised to 42 picofarads, indicated by curve C, a total phase advance of 170° is made available, most of the phase shift being introduced as the last 20 percent of the total value of resistor 34 is eliminated.

The range of the inventive tint control network is confined to substantially 90° or less when the value of capacitance 32 is such as to cause condition of resonance or above-resonance, represented by curve A of FIG. 2, to occur. If the component values are shifted too far below the resonance point, in order to attain more range of phase shift, the desirable voltage step-up due to the resonant effect is substantially lessened and the amplitude of the signal applied to the amplifier is reduced.

Figure 3:
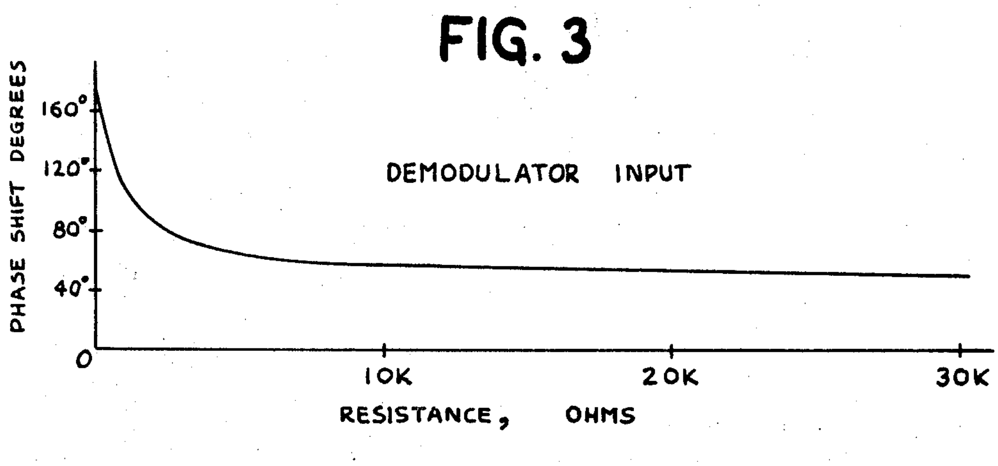
FIG. 3 is a graph displaying the effect of changes in resistance on the induced phase shift.

In practice, the above effects are modified due to the interaction of the elements of the tint control network and the related circuitry in the reference subcarrier oscillation and amplification means. As the value of resistor 34 is changed, the load upon the output of oscillator 13 modifies the phase of the signal perceived by the tint control network, The phase shift thus created is effectively subtracted from the range of the tint network, thereby resulting in an effective tint control range that is less than the range of the tint control network alone. The response of the tint control network in conjunction with an oscillator of the type depicted is shown in FIG. 3 wherein an effective tint control range of approximately 120° is provided, using a shielded cable having a capacitance of 34 pf. In order to obtain a substantially linear phase shift response as potentiometer 34 is adjusted, it is only necessary to provide a tapered potentiometer whose resistive characteristics complement the curve of FIG. 3. While this is not necessary to the proper operation of the device, it enhances the use of the device in a consumer television receiver to be operated by the viewer, as it renders the response of displayed hues to changes in control setting much more uniform.

The present tint control system allows increased simplicity and economy of design as it makes shielded cable 32 do double duty, both for avoiding undesirable interaction between the conductor carrying the 3.58 MHz reference signal and surrounding circuitry, and for constituting a necessary capacitive element in the system. It further provides a convenient connection point for the ground-potential end of inductor 36 which, along with inductor 31 and the capacitance provided by the shielded cable, constitutes a resonant circuit.

As will be evident from the foregoing description, certain aspects of the invention are not limited to the particular details of construction and the examples illustrated, and it is therefore contemplated that other modifications or applications will occur to those skilled in the art. It is therefore intended that the appended claims shall cover such modifications and applications as do not depart from the true spirit and scope of the invention.

What is claimed as new and desired to be secured by Letters Patent of the United States is:

1. In a color television receiver including oscillator means for producing a subcarrier reference signal and utilization means for receiving the subcarrier reference signal, means for varying the phase of the subcarrier signal including:

conductor means for transmitting the subcarrier reference signal to the utilization means;

first inductor means connected in series relationship with said conductor means;

first capacitor means connecting said conductor means to a point of reference potential; and the series combination of second inductor means and variable resistance means operatively connected between said conductor means and said point of reference potential.

2. The invention as defined in claim 1 wherein said first capacitor means comprises shielded conductor means connecting said first conductor means and said variable resistance means.

3. The invention as defined in claim 2 wherein said variable resistance means is a potentiometer.

4. The invention as defined in claim 3 wherein said second inductor means is operatively connected between the shielding element of said shielded conductor means and the variable terminal of said potentiometer.

5. The invention as defined in claim 3 wherein said means for varying the phase of said subcarrier signal has a resonant frequency which is substantially the same as the frequency of said subcarrier signal.

* * * * *